(12) United States Patent
Lie (10) Patent No.: US 8,693,283 B2
(45) Date of Patent: Apr. 8, 2014

(54) ESTIMATION OF TIME SHIFT BASED ON MULTI-VINTAGE SEISMIC DATA

(75) Inventor: Espen Oen Lie, Bønes (NO)

(73) Assignee: Statoil Petroleum AS, Stavanger (NO)

( * ) Notice: Subject to any disclaimer, the term of this patent is extended or adjusted under 35 U.S.C. 154(b) by 534 days.

(21) Appl. No.: 12/891,541

(22) Filed: Sep. 27, 2010

(65) Prior Publication Data

US 2011/0075515 A1 Mar. 31, 2011

Related U.S. Application Data

(60) Provisional application No. 61/272,495, filed on Sep. 30, 2009.

(51) Int. Cl.
*G01V 1/28* (2006.01)
*G01V 1/30* (2006.01)

(52) U.S. Cl.
CPC .................................. *G01V 1/308* (2013.01)
USPC .................................. 367/38; 367/73; 702/14

(58) Field of Classification Search
USPC .................................. 367/38, 40, 73; 702/14
See application file for complete search history.

(56) References Cited

U.S. PATENT DOCUMENTS

| | | | | |
|---|---|---|---|---|
| 4,969,130 | A * | 11/1990 | Wason et al. | 367/73 |
| 5,831,935 | A * | 11/1998 | Luo et al. | 367/47 |
| 6,041,018 | A | 3/2000 | Roche | |
| 6,438,069 | B1 | 8/2002 | Ross et al. | |
| 8,073,625 | B2 * | 12/2011 | Deffenbaugh et al. | 702/14 |
| 2003/0055568 | A1 | 3/2003 | Zauderer et al. | |

OTHER PUBLICATIONS

Naeini et al., "Simultaneous multivintage time-shift estimation", Geophysics, vol. 74, #5, Sep. 1, 2009, pp. V109- V121.*

Fagervik K. et al.; "A Method for performing History Matching of Reservoir Flow Models using 4D Seismic", Seg Int. Exposition and Annual Meeting, (Sep. 9, 2001)-(Sep. 14, 2001), pp. 1-4, San Antonio, TX, XP-002612005.

* cited by examiner

*Primary Examiner* — Ian J Lobo
(74) *Attorney, Agent, or Firm* — Birch, Stewart, Kolasch & Birch, LLP (57) ABSTRACT

The invention is a method of calculating seismic time shifts $\Delta \vec{t}(t)$, comprising:

conducting a number (n) of three or more seismic surveys with large time differences such as months or years, producing a number (n) of three or more vintages of seismic data $d_1(t), d_2(t), \ldots, d_n(t)=\vec{d}(t)$, each said vintage of seismic data $d_i(t)$ comprising one or more seismic traces, calculating partial time derivatives from one or more base trace $$\frac{\partial}{\partial t} d_b(t)$$

multiplied by the sought time shift $\Delta t(t)$ and setting the product like $$\frac{\partial}{\partial t} d_b(t) \Delta t(t) = \Delta d,$$

simplified to $L\Delta t(t)=\Delta d$ wherein L comprises the partial time derivatives, and forming a set of (n−1) equations $\tilde{L}\Delta \vec{t} = \Delta \vec{d}$ which is overdetermined in the series of consecutive time shifts $\Delta \vec{t}(t)$, and solving for the consecutive time shifts $\Delta \vec{t}(t)$.

29 Claims, 8 Drawing Sheets
(5 of 8 Drawing Sheet(s) Filed in Color)

Fig. 7: Consistency of using single combinations

Fig. 8:
Time shifts calculated using an overdetermined system of multivintage seismic data sets

ESTIMATION OF TIME SHIFT BASED ON MULTI-VINTAGE SEISMIC DATA

CROSS REFERENCE TO RELATED APPLICATIONS

This Non-Provisional application claims the benefit of U.S. Provisional Application No. 61/272,495 filed on Sep. 30, 2009. The entire content of the above application is hereby incorporated by reference into the present application.

INTRODUCTION

The present invention relates to seismic data processing. More specifically, the invention relates to a method of calculating seismic time shifts between vintages of seismic data. The purpose of the method of the invention is to obtain an improved measurement of time shift in the seismic data in order to interpret such time shift to relate to reservoir parameters which may change during production of petroleum fluids. The time shifts may be used during petroleum production activities. The time shifts may be used for monitoring production from subsurface geological reservoirs. The time shifts may be used, for example along with other petroleum reservoir data, as input data for controlling further production from said subsurface reservoirs, such as controlling fluid injection rates, gas production rates, petroleum production rates, changing production positions, or setting new production or injection wells.

For finding petroleum fluids in geological strata the seismic method is the prime method. Seismic signals are generated at the surface and propagate downward and are partly reflected by every seismic impedance contrast. Seismic impedance is the product of seismic acoustic velocity and density. The seismic signals are acquired by a series of seismic sensors after having been reflected, and the time series collected at a seismic sensor for each seismic transmission from the seismic source is called a seismic trace. For monitoring or controlling the development of the fluid content of the geological strata during petroleum fluid production so-called time-lapse seismic data are conducted during the life of the petroleum field. Material changes within the geological strata may cause changes of the local seismic impedance and may be seen as a time shift between seismic data acquired at different times during petroleum production. Knowing parameters about the material changes of the geological strata may provide key information to how to control the petroleum fluid production such as adjusting the production rate of gas or petroleum, adjusting the depth of which petroleum fluids are produced, or determining injection rates of gases or fluids in order to support the petroleum fluid production.

For obtaining the seismic data for the method according to the present invention one may conduct a number of three or more seismic surveys of said subsurface geological reservoirs with large time differences such as months or years, producing a number of three or more vintages of seismic data, each said vintage of seismic data comprising a number of seismic traces of registrations of seismic data acquired each 4 milliseconds or so. Each seismic survey usually comprises millions of seismic samples and it requires huge processing capacity to analyse the seismic data.

The present invention relates to estimation of time shifts in seismic data acquired in different vintages. In other words, the present invention uses seismic data measured over a geological structure or geographical in which the seismic data acquisition is repeated in three or more vintages, each vintage separated in time by, say, one or two years.

Long time spans may separate the vintages of seismic data. In one example, the initial or "base" 3-D seismic data survey may have been conducted for mapping in three-dimensional detail a petroleum prospect as early as in 1989, then a seismic survey may have been conducted in generally the same manner in the same place eight years later in 1997 before production drilling has started in the area, then repeated seismic surveys have been conducted during gas or petroleum production each second year in 2001, 2003, 2005, 2007, 2009.

Two-way propagation reflection time (twt) seismic data are generally collected as in ordinary 2-D or 3-D seismic surveys, such as in marine or land surveys. In the seismic data collected during the years, the geological structures as such may generally not have changed significantly during the time span in question. (An exception to this assumption may be petroleum reservoirs experiencing significant lithological compaction due to decreased liquid content such as after petroleum production in the Ekofisk field.) However, due to changes in gas or liquid content, particularly in reservoir layers of porous or permeable geological formations, the local seismic velocity, such as seismic p-wave or s-wave velocity, in one or more of the geological layers affected may change due to fluid migration such as production of fluids such as oil or gas, or injection of fluids such as gas or water or $CO_2$.

A change in the seismic velocity in one layer of significant thickness or a consecutive sequence of layers may give rise to a detectable time shift of seismic peaks and troughs as a function of the two way time t in the layer itself. The local time shift will be proportional to the local change in seismic velocity and also proportional to the thickness of the layer in question. Please notice that a calculated time shift may be far less than the seismic sampling time resolution corresponding to 4 ms normal sampling or 8 ms for sparse sampling. A time shift occurring in one layer will shift all layers below the actual layer the same amount of time shift. Time shift in two or more layers is a cumulative function. If several consecutive layers have a generally even changed seismic velocity they may contribute to a generally increasing time shift as counted from the top to the bottom of the layers in question. Moreover, such a stack of layers will contribute to a constant time shift for the geological layers below. This is similar to the effect of the one single layer inducing a time shift. In general, the time shift in the two-way time trace is cumulative from the upper layer displaying time shift and downwards, increasing or decreasing cumulatively for each new layer having its own time shift.

A time shift $\Delta t(t)$ may be calculated on a trace-by-trace basis by subtracting a single, first seismic trace $d_1(t)$ acquired at a specific position at a first time $t_1$ from a single, second seismic trace $d_2(t)$ acquired at the same specific position at a second time $t_2$. The dimensions in a broader aspect may be extended so as for a three-dimensional time shift cube or volume of time shifts $\Delta t(t)$ may be calculated by subtracting a first set of traces, stacked or not, from a first set of seismic traces $d_1(t)$ acquired from a specifically positioned cube or volume or region of the earth at a first time $t_1$ from a generally equally sampled second cube or volume of seismic traces $d_2(t)$ acquired at the same specific position at a second time $t_2$. The sampled Earth volume may be represented by e.g. 400 time samples×250 traces in-line times×250 traces cross-line totalling 25000000 seismic samples, all samples comprising some noise.

One significant area of use for estimating time shifts is for petroleum fluid production from a given part of the geological subsurface formations and monitoring the time shifts in that geological underground as the production process progresses. Significant changes in the observed or calculated time shifts may be interpreted as changes in the fluid masses, pressure changes in the gas masses, and/or changes of the fluid interface positions in the geological strata or geological traps. The changes in the fluid masses may thus be used for controlling the production processes including adjusting production rates or determining injection rates or even halting injection. Further, changes in the fluid masses may be used in the decision process of determining the position of auxiliary production drilling.

Figure 1:
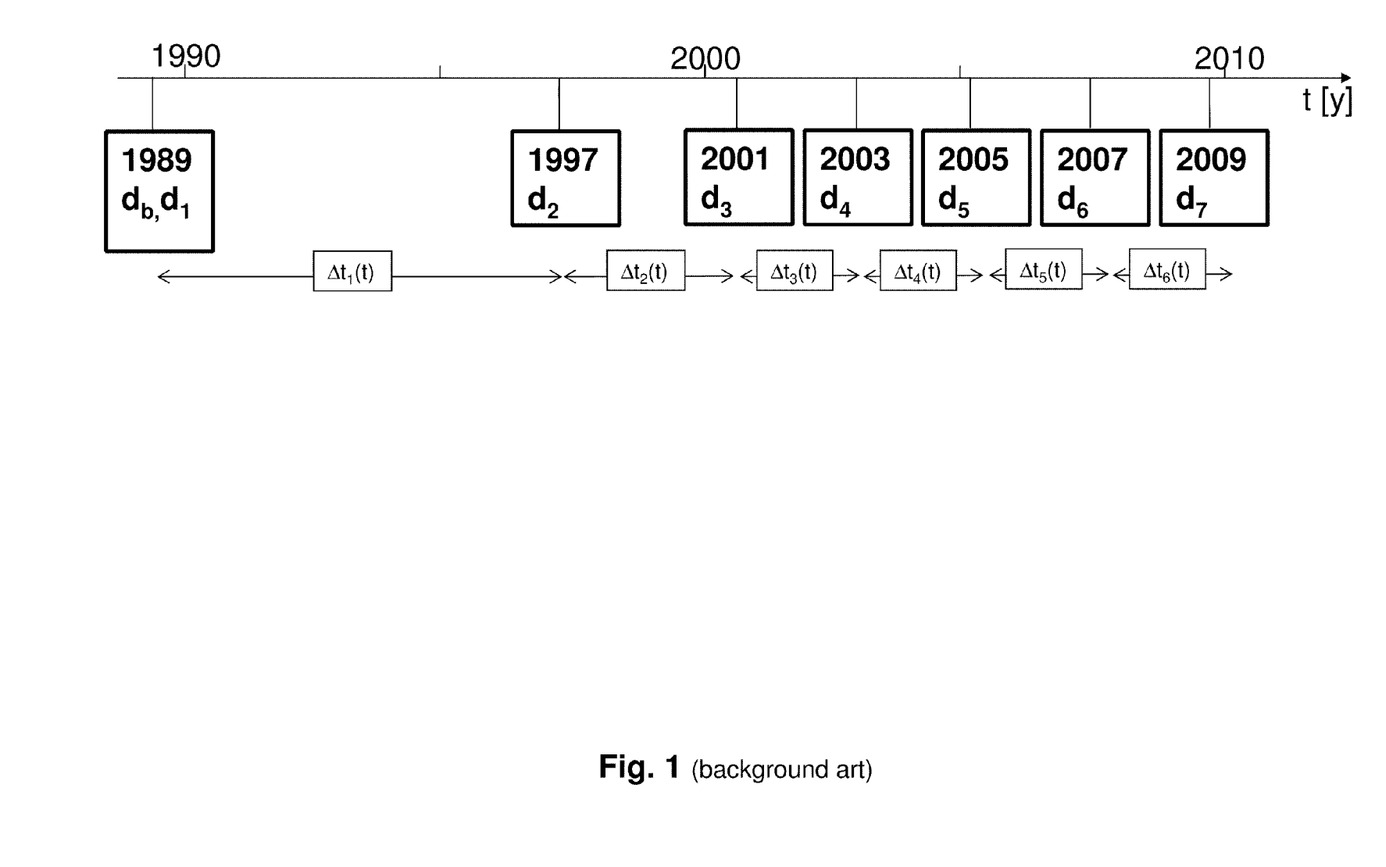
Figure 2:
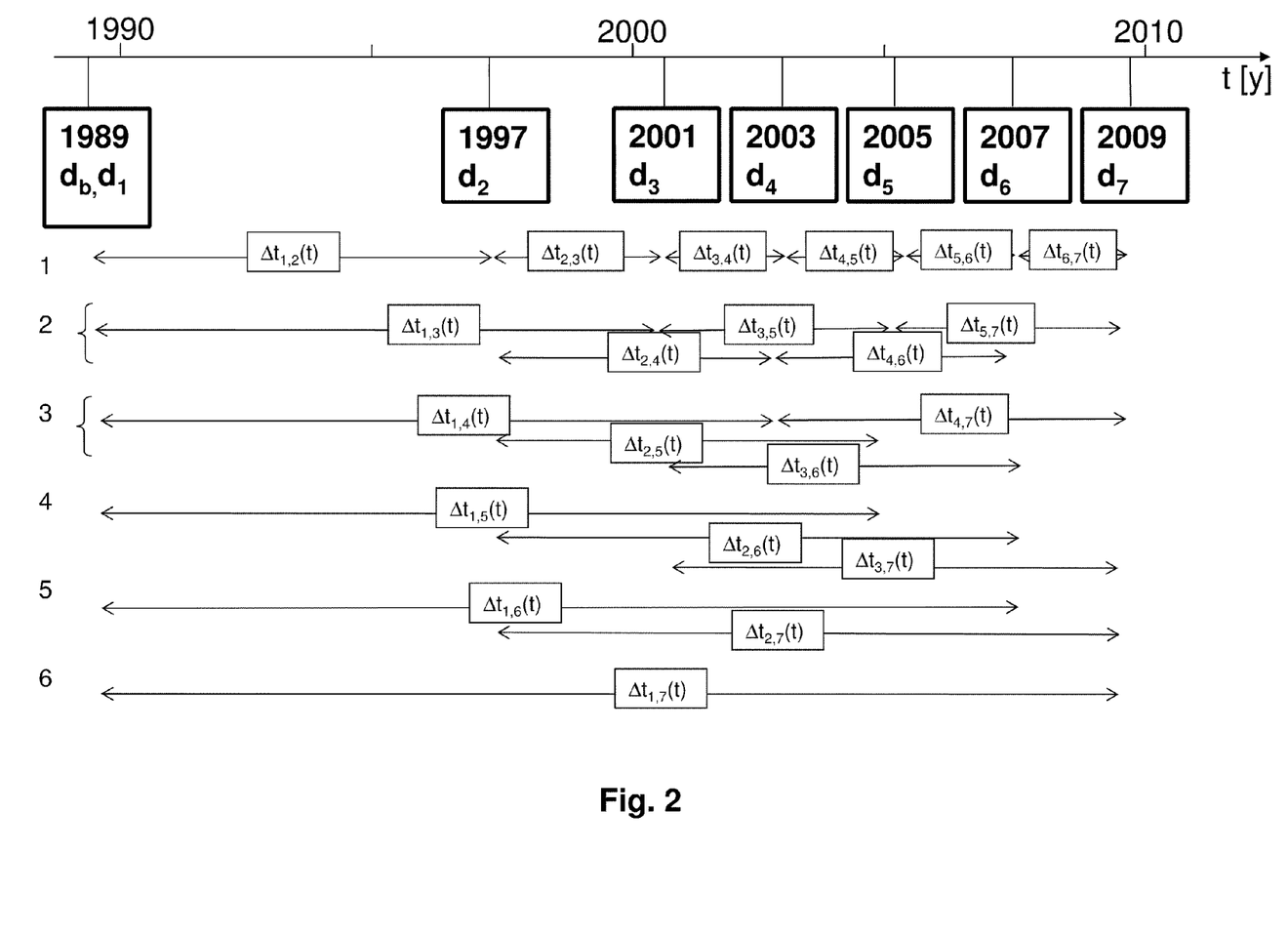
FIG. 2 shows a similar set of seismic data vintages as illustrated in FIG. 1, and a number of potential time shift data which may be calculated between all of the seismic vintage data sets. However, calculating all such data sets will be a laborious task increasing with the square of the number n of data sets.

In FIG. 1 is shown several vintages of seismic data acquired as $d_1$ in 1989, $d_2$ in 1997, $d_3$ in 2001, $d_4$ in 2003, $d_5$ in 2005, $d_6$ in 2007, and $d_7$ in 2009. Consecutive time shifts $\Delta t_i(t)$ may be calculated by using a subtraction method producing e.g. the closest consecutive time shifts $\Delta t_{1-2}(t)$ between 1989 and 1997, $\Delta t_{2-3}(t)$ between 1997 and 2001, $\Delta t_{3-4}(t)$ between 2001 and 2003, up to $\Delta t_{6-7}(t)$ between 2007 and 2009, all in all (n−1) time shifts out of (n) consecutive data sets. Two simple facts arise: The first fact is that a cumulative time shift calculated by adding all the consecutive time shifts from $\Delta t_{1-2}(t)$ to $\Delta t_{6-7}(t)$, should ideally be the same as the total time shift $\Delta t_{1,7}(t)$ between the first data set $d_1$ from 1989 and the later data set $d_7(t)$ from 2009. The second fact is that all the seismic measurements contain noise due to general seismic noise during the acquisition and instrumental noise. Thus $\Delta t_1, \Delta t_2, \ldots \Delta t_n$ contain noise and do not as such represent true, intrinsic time shifts $\Delta t_i$.

BRIEF SUMMARY OF THE INVENTION

The above problems may be remedied by the invention which is a method of calculating seismic time shifts $\Delta t(t)$ between vintages of seismic data $d(t)$ for monitoring production from subsurface geological reservoirs, comprising:
conducting a number (n) of three or more seismic surveys of said subsurface geological reservoirs with large time differences such as months or years, producing a number (n) of three or more vintages of seismic data $d_1(t)$, $d_2(t), \ldots, d_n(t)=\vec{d}(t)$, each said vintage of seismic data $d_i(t)$ comprising one or more seismic trace,
formulating an operator between up to n(n−1)/2 possible pairs of said seismic data sets $\vec{d}(t)$ and their corresponding up to n(n−1)/2 time shifts $\Delta t(t)$;
solving for (n−1) time shifts $\Delta t(t)$ between (n−1) selected pairs of vintages of said seismic data $d_1(t), d_2(t), \ldots, d_n(t)$ as an overdetermined system of equations,
applying one or more of said calculated time shifts $\Delta t_{1-2}(t)$, $\Delta t_{2-3}(t), \ldots, \Delta t_{n-1,n}(t)$ as input data for controlling further production from said subsurface reservoirs.

According to an advantageous embodiment of the method, in the step of selecting the time shifts to be solved, it is preferred to select the (n−1) time consecutive shifts $\Delta t_{1-2}(t)$, $\Delta t_{2-3}(t), \ldots, \Delta t_{n-1,n}(t)$ between consecutive vintages of said seismic data $d_1(t), d_2(t), \ldots, d_n(t)$. Other time spans between vintages to select time shifts to be solved for may as well be used without contributing anything new.

In a preferred embodiment of the invention, the method comprises, in the step of formulating said operator between the n(n−1)/2 possible pairs of said seismic data sets $\vec{d}(t)$, to
calculate partial time derivatives from at least one base trace $$\frac{\partial}{\partial t}d_b(t),$$

formulate the operator between said n(n−1)/2 possible pairs of seismic data sets $\vec{d}(t)$ and their corresponding n(n−1)/2 time shifts $\Delta t(t)$ as $$\frac{\partial}{\partial t}d_b(t)\Delta t(t) = \Delta d,$$

simplified to $L\Delta t(t)=\Delta d$ wherein L comprises the partial time derivatives.

In a preferred embodiment of the invention, the method of further comprises, in the step of formulating said operator,
forming a set of n(n−1)/2 equations $\tilde{L}\Delta \vec{t}(t)=\Delta \vec{d}$ which is overdetermined in said series of time shifts, preferably consecutive, such as $\Delta t_{1-2}(t), \Delta t_{2-3}(t), \ldots, \Delta t_{n-1,n}(t)$.

According to a preferred embodiment of the invention, each said vintage of seismic data $d_i(t)$ comprises seismic traces representing a three-dimensional volume of part of the underground geological formations, said resulting series of consecutive time shifts $\Delta \vec{t}(t)$ representing time shifts in said volume part of the underground geological formations.

According to a preferred embodiment of the invention, the method further comprises calculating partial time derivatives $$\frac{\partial}{\partial t}d_b(t)$$

of the traces by estimating coefficients of basis functions.

According to a preferred embodiment of the invention, the method of estimating coefficients comprises estimating spline function coefficients. The order may be low, such as at least order one or higher, up to four or even five.

If using Laplacian basis functions, coefficients may be very low or rather low, such as four or five.

According to a first aspect of the present invention there is provided a method of determining time shifts $\Delta t(t)$ between vintages of seismic data $d(t)$ relating to a subsurface geological formation, the method comprising: providing a number n of three or more vintages of seismic data $d_1(t), d_2(t), \ldots, d_n(t)$ obtained from a corresponding number n of seismic surveys of the subsurface geological formation carried out at least a plurality of months or years apart, each vintage of seismic data $d_i(t)$ comprising at least one seismic trace; formulating an operator between a first number of the n(n−1)/2 possible amplitude differences $\Delta t_{b,m}(t)$ between pairs $d_b(t), d_m(t)$ of the seismic data sets and a second number of the corresponding n(n−1)/2 possible time shifts $\Delta t_{b,m}(t)$, where the second number is arranged to be less than the first number by using a known inter-relationship between at least some of the n(n−1)/2 possible time shifts $\Delta t_{b,m}(t)$, thereby forming an overdetermined set of equations; and solving the overdetermined set of equations for the second number of time shifts $\Delta t_{b,m}(t)$ to determine the time shifts $\Delta t(t)$.

The method may comprise using one or more of the determined time shifts $\Delta t(t)$ as input for monitoring or controlling production or further production from a subsurface reservoir, or at least arranging for or causing such use.

Each amplitude difference $\Delta d_{b,m}(t)$ may derive from a difference between a seismic trace in data set $d_m(t)$ and a seismic trace in data set $d_b(t)$.

The first number may be n(n−1)/2, such that the amplitude differences $\Delta d_{b,m}(t)$ between all n(n−1)/2 possible pairs $d_b(t)$, $d_m(t)$ of the seismic data sets are used.

The second number may be (n−1), with the (n−1) time shifts $\Delta t_{b,m}(t)$ being the (n−1) consecutive time shifts $\Delta t_{1,2}(t)$, $\Delta t_{2,3}(t), \ldots, 66\, t_{n-1,n}(t)$ between consecutive vintages of said seismic data.

The step of formulating the operator may comprise calculating, for each of the first number of amplitude differences $\Delta d_{b,m}(t)$, a partial time derivative of a trace from the pair of seismic data sets $d_b(t)$, $d_m(t)$ forming that amplitude difference $\Delta d_{b,m}(t)$, the partial time derivative being represented as $L_{b,m}$.

The partial time derivative may be calculated by estimating coefficients of basis functions.

The basis functions may comprise spline functions or Laplacian functions.

The order of spline function coefficients may be low such as one to four.

The number of Laplacian basis function coefficients may be between two and five.

The partial time derivative for $\Delta d_{b,m}(t)$ may be $$\frac{\partial}{\partial t} d_b(t),$$

where $d_b(t)$ is the earlier seismic data set of the pair of seismic data sets $d_b(t)$, $d_m(t)$.

The set of equations, before use of the known inter-relationship, may be represented as $L_{b,m} \Delta t_{b,m} = \Delta d_{b,m}$ or in matrix form as $L \Delta \vec{t} = \Delta \vec{d}$ where L is a diagonal matrix and $\Delta t$ and $\Delta d$ are vectors. Use of the known inter-relationship may involve reducing a dimension of the vector $\Delta t$ and a corresponding dimension of the matrix L, and duplicating and/or rearranging at least one of the elements of the matrix L to form matrix $\tilde{L}$, thereby creating the overdetermined set of equations $\tilde{L} \Delta \vec{t} = \Delta \vec{d}$.

The method may comprise first determining $\tilde{A} = \tilde{L}^T \tilde{L}$ and $\tilde{B} = \tilde{L}^T \Delta \vec{d}$ and then solving for $\Delta \vec{t}$ based on $\Delta \vec{t} = \tilde{A}^{-1} \tilde{B}$, which is equivalent to $\Delta \vec{t} = (\tilde{L}^T \tilde{L})^{-1} \tilde{L}^T \Delta \vec{d}$, or alternatively solving for $\Delta \vec{t}$ directly based on $\Delta \vec{t} = (\tilde{L}^T \tilde{L})^{-1} \tilde{L}^T \Delta \vec{d}$.

Each said vintage of seismic data $d_i(t)$ may comprise a seismic trace representing a three-dimensional volume of part of the subsurface geological formation, said resulting time shifts $\Delta t(t)$ representing time shifts in said volume part of the subsurface geological formations.

The known inter-relationship may be that the sum of a plurality of individual consecutive time shifts is equal to the time span from the time span from the start of the first time shift of the plurality to the end of the final time shift of the plurality, for example $\Delta t_{1,3} = \Delta t_{1,2} + \Delta t_{2,3}$ or $\Delta t_{X,Y} = \Delta t_{X,X+1} + \Delta t_{X+1,X+2} + \ldots + \Delta t_{Y-2,Y-1} + \Delta t_{Y-1,Y}$.

The method may comprise acquiring the seismic data sets.

The method may comprise using the determined time shifts during petroleum production activities, or at least arranging for or causing such use.

According to a second aspect of the present invention there is provided a method of determining or detecting a change in a geophysical property of a subterranean region of the earth, such as material changes in geological strata, comprising performing the method according to the first aspect of the present invention, wherein the seismic data sets are acquired from the region, and further comprising: using the determined time shifts to determine a change in the geophysical property of the region.

The method may comprise using the determined change in the geophysical property during petroleum production activities, or at least arranging for or causing such use.

According to a third aspect of the present invention there is provided a method in which the time shifts determined according to the method of the first aspect of the present invention or the change in the geophysical property determined according to the second aspect of the present invention is/are used during petroleum production activities.

The above-mentioned petroleum production activities may comprise at least one of: monitoring or controlling petroleum fluid production; adjusting the production rate of gas or petroleum; adjusting the depth of which petroleum fluids are produced; and determining injection rates of gases or fluids in order to support the petroleum fluid production.

The subsurface geological formation may comprise a subsurface geological reservoir.

According to a fourth aspect of the present invention there is provided an apparatus for performing a method according to any of the first to third aspects of the present invention.

According to a fifth aspect of the present invention there is provided a program for controlling an apparatus to perform a method according to any of the first to third aspects of the present invention or which, when loaded into an apparatus, causes the apparatus to become an apparatus according to the fourth aspect of the present invention. The program may be carried on a carrier medium. The carrier medium may be a storage medium. The carrier medium may be a transmission medium.

According to a sixth aspect of the present invention there is provided an apparatus programmed by a program according to the fifth aspect of the present invention.

According to a seventh aspect of the present invention there is provided a storage medium containing a program according to the fifth aspect of the present invention.

SHORT FIGURE CAPTIONS

The patent or application file contains at least one color drawing. Copies of this patent or patent application publication with color drawing will be provided by the USPTO upon request and payment of the necessary fee.

The invention is illustrated in the following drawings, in which:

FIG. 1 shows background art in which time shift series are calculated based on pairs of seismic data vintages such as 1989 and 1997, 1997 and 2001, and so on.

EMBODIMENTS OF THE INVENTION

Contrary to calculating time shifts based on pairs of seismic vintage data sets, usually consecutive seismic data sets, several vintages of seismically acquired data may produce several possible combinations of time shifts. Having three consecutive data sets $d_1$ $d_1$ $d_3$ may give rise to three time shift sets $\Delta t_{1-2}$, $\Delta t_{2-3}$, $\Delta t_{1-3}$ of which
$\Delta t_{1-2}$ and
$\Delta_{2-3}$ are directly estimated and
$\Delta\Delta t_{1-3} = \Delta\Delta t_{1-2} + \Delta t_2 {-}_3$.
Combinatorially, the number of combinations of possible time shift volumes increase as $(n-1)n/2$:
2 data sets may give 1 combination.
3 data sets may give 3 combinations.
4 data sets may give 6 combinations.
5 data sets may give 10 combinations.
6 data sets may give 15 combinations, and so on.
Thus 6 data sets provide 15 measurements of $(6-1)=5$ actual physical time shift parameters. Notice that the time shift parameters are multidimensional and may be of significant size. This provides a redundancy which may be utilized according to the present invention to reduce noise and more precisely calculate the intrinsic time shifts. We may estimate $(n-1)n/2$ time shifts between all combinations between n data sets. If solving for the $(n-1)$ intrinsic physical time shifts from $(n-1)n/2$ estimated time shifts, instead of attempting to estimating all the time shifts, we may reduce the number of volume cubes while utilizing the potential of increasing the signal to noise ratio S/N increasing with the square root of n provided by the large number of measurements $d_1 \ldots d_n$.

Figure 3:
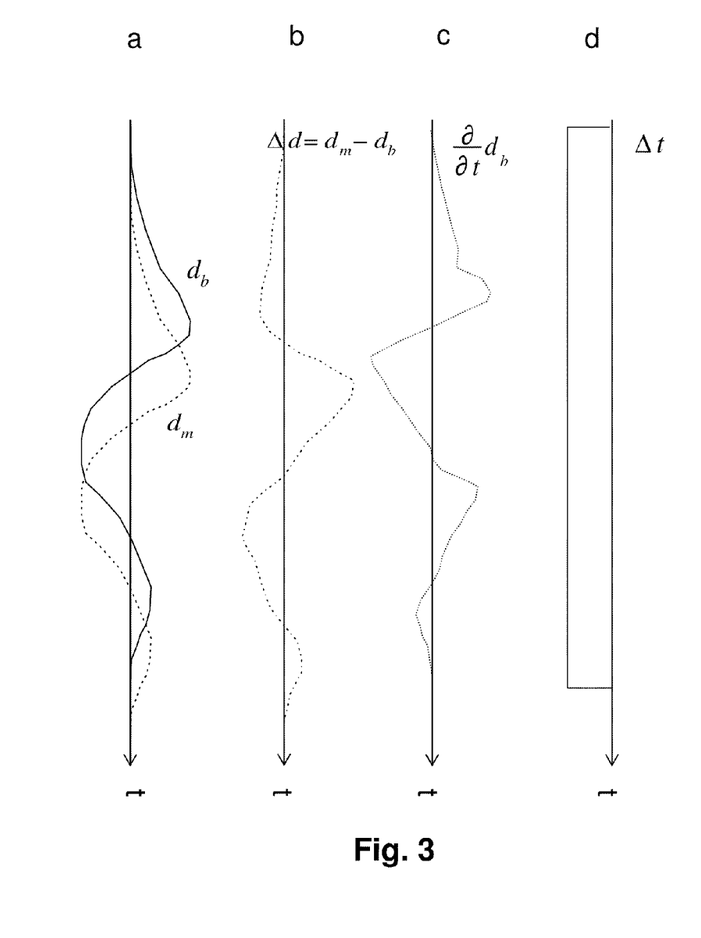
FIG. 3 illustrates in (a) a set of two vintages of one seismic trace, in (b) a difference between the two vintages of the seismic trace, in (c) a partial time derivative of the base seismic trace, and in (d) an estimated time shift, here constant for the actual interval.

A method currently used in time shift estimation by the inventor may be illustrated using the trace illustrations of FIG. 3. FIG. 3a describes a base trace $d_1$ here named $d_b$, the index "b" indicating base. Further, a later acquired monitor trace $d_2$, $d_3$, $d_i$ here named $d_m$, the index "m" for "monitor". FIG. 3d indicates a time shift, here shown constant, of which $d_m$ has been displaced relative to $d_b$. The amplitude difference $\Delta d$ between the monitor trace $d_m$ and the base trace $d_b$ is formed simply by subtracting $d_b$ from $d_m$ as shown in FIG. 3b. A time derivative of the base trace $$\frac{\partial}{\partial t} d_b(t)$$

is shown in FIG. 3c. Now we have the elements for setting up a basic equation for the amplitude difference $\Delta d$ between the time shifted traces:

$$\Delta d(t) = d_m(t) - d_b(t) = \frac{\partial}{\partial t}d_b(t)\Delta t(t) + \varepsilon(t) + d_{4D}(t) \text{ or}$$

$$\Delta d = \frac{\partial}{\partial t}d_b \Delta t + \varepsilon + d_{4D}$$

that is: the amplitude difference $\Delta d(t)$ between the monitor trace and the base trace may be expressed as the partial time derivative of the base trace multiplied with the time shift $\Delta t(t)$, plus random noise, plus possible new events $d_{4D}(t)$ at one or more depths, new events which were not in the base trace $d_b$.

According to the background art, the time shift $\Delta t(t)$ has been calculated discretely as time shift vectors for every point of $d_m(t)$. This is a highly laborious task which requires vast amounts of processing time for seismic data. Given the noise of both $d_m(t)$ and $d_b(t)$ the calculated time shift $\Delta t(t)$ calculated according to the background art may be highly discontinuous and requires some smoothing techniques to be applied. Such discrete time shifts have also been attempted to be correlated laterally to provide better consistency. A priori, it is not likely that the time shift should be discontinuous; rather, it should be a quite smooth function of two way seismic time t, having only sharp gradients on gas/liquid surfaces which have been displaced.

In a preferred embodiment of the invention, the time shift function $\Delta t(t)$ may, instead of being calculated as a time shift vector for every 4 millisecond or 8 millisecond sample, rather be calculated far more efficiently by expressing a time shift function by calculating coefficients of basis functions. Instead of calculating 400 time shift vectors for a 400 sample trace, and conducting smoothing operations, one may calculate a few first coefficients of a selected basis function and obtain an estimated time shift function $\Delta t_e(t)$. The inventor has conducted several experiments on real data set vintages by calculating a few coefficients of basis functions such as Laplacian functions, spline functions, polynomials, etc. Using Laplacian functions a specific set of Laplacian coefficients will have an impact on the entire part of the seismic trace selected. The spline function coefficients of low order may be preferred because a low order spline function need not have a global influence on the entire two-way time range selected, but will have limited time (depth) range. This is a preferred method for providing a smooth estimated time shift function in the method of the invention described below. Other methods for finding the time shift function, such as brute force vector calculation methods of the background art may be used. It is believed that the use of basis function coefficients significantly reduces the computational load for finding a time shift between traces of different vintages.

The above method was developed for finding the time shift function between two vintages. The above formula $$\Delta d(t) = \frac{\partial}{\partial t} d_b(t) \Delta t(t) + \varepsilon(t) + d_{4D}(t)$$

may be rewritten as $$\Delta d = L \Delta t$$

or $$L \Delta t = \Delta d$$

in which L contains the partial time derivatives of the base trace, i.e. $\frac{\partial}{\partial t} d_b(t)$, but not the noise and the possible 4D contribution.

The material dimensions of the above two equations need not only comprise one single trace. The material dimensions may be broadened to relate to a seismic section profile or a seismic volume with length along a set of generally parallel seismic survey lines, and width along a cross-line direction, and the time samples along the vertical direction. Please notice, as above, that depth in this context is considered as constant (i.e. depth shift is not allowed) while time shift is allowed.

Figure 4:
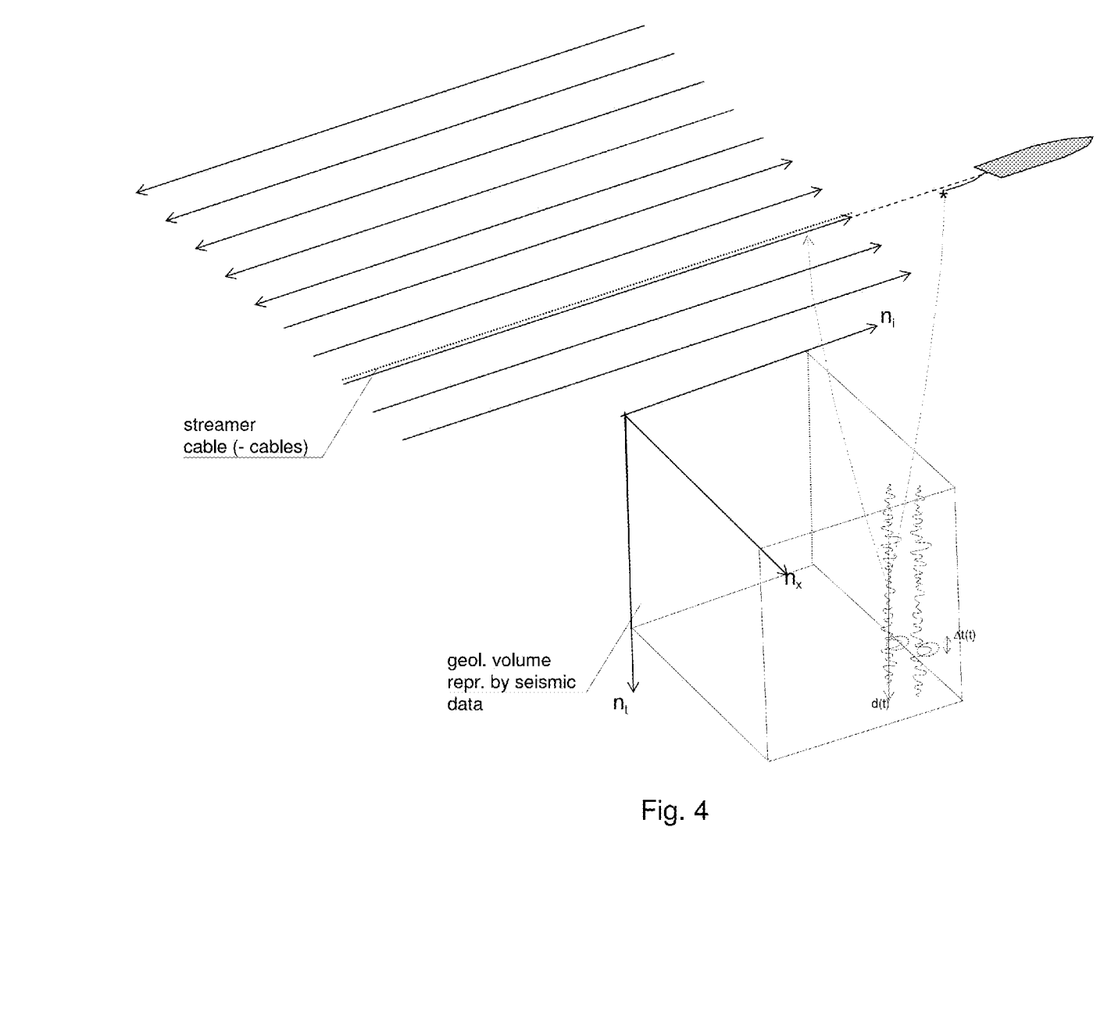
FIG. 4 illustrates a seismic vessel at the sea surface conducting a seismic reflection survey. The seismic data collected may represent a volume of the subsurface and two vintages of one seismic trace is illustrated, one of them exhibiting a time shift down in the volume. Such a time shift will usually have to be laterally continuous to neighbouring traces in order to be significant, but here we illustrate only one such partially time shifted trace.

So L may be a 3-D volume matrix $n_t \times n_i \times n_x$ of 400 samples×1000 traces inline×100 lines, for example, please see FIG. 4. In practice only a relevant depth part of the traces is used, not the entire depth of all traces, for finding time shift near a petroleum production relevant depth of the geological layers.

We may express two differences between three consecutive vintages of seismic volume data $L_1$, $L_2$ expressed in matrix form in an analogue way as the above, as follows:

$$\begin{bmatrix} L_{1-2} & 0 \\ 0 & L_{2-3} \end{bmatrix} \begin{bmatrix} \Delta t_{1-2} \\ \Delta t_{2-3} \end{bmatrix} = \begin{bmatrix} \Delta d_{1-2} \\ \Delta d_{2-3} \end{bmatrix}$$

Here, the left matrix is a diagonal matrix of matrixes L, the time shifts $\Delta t_{1-2}(t)$ and $\Delta t_{2-3}(t)$ are "observed", i.e. the only two consecutive time shifts as estimated or calculated between three consecutive seismic data volume vintages, noise inclusive.

We now illustrate the method using three vintages of seismic data d(t). Due to the fact that we actually have three vintages in the example above, we may also use the difference between the first and third data set:

$$\begin{pmatrix} L_{1,2} & 0 & 0 \\ 0 & L_{2,3} & 0 \\ 0 & 0 & L_{1,3} \end{pmatrix} \begin{pmatrix} \Delta t_{1,2} \\ \Delta t_{2,3} \\ \Delta t_{1,3} \end{pmatrix} = \begin{pmatrix} \Delta d_{1,2} \\ \Delta d_{2,3} \\ \Delta d_{1,3} \end{pmatrix}$$

Written out in full, this would be:

$$L_{1,2} \Delta t_{1,2} = \Delta d_{1,2}$$

$$L_{2,3} \Delta t_{2,3} = \Delta d_{2,3}$$

$$L_{1,3} \Delta t_{1,3} = \Delta d_{1,3}$$

Physically it can be stated that:

$$\Delta t_{1,3} = \Delta t_{1,2} + \Delta t_{2,3}$$

so that the final one of the above three equations can be re-written as:

$$L_{1,3}(\Delta t_{1,2} + \Delta t_{2,3}) = \Delta d_{1,3}$$

Thus we may rewrite the above matrix formulation as $$\begin{pmatrix} L_{1,2} & 0 \\ 0 & L_{2,3} \\ L_{1,3} & L_{1,3} \end{pmatrix} \begin{pmatrix} \Delta t_{1,2} \\ \Delta t_{2,3} \end{pmatrix} = \begin{pmatrix} \Delta d_{1,2} \\ \Delta d_{2,3} \\ \Delta d_{1,3} \end{pmatrix}$$

$$\left( \text{or } \tilde{L} \Delta \vec{t} = \Delta \vec{d} \right)$$

which is an overdetermined system with one degree of freedom less. In other words, prior to the substitution of $\Delta t_{1,3} = \Delta t_{1,2} + \Delta t_{2,3}$, there were n(n−1)/2 equations and the same number n(n−1)/2 of unknowns ($\Delta t$), which in the above example is three equations and three unknowns. After the substitution, there were a first number n(n−1)/2 of equations with only a second number (n−1) of unknowns (the n−1 time shifts), which in the above example is three equations and two unknowns; the second number (number of unknowns) is smaller than the first number (number of equations). This is an overdetermined set of equations. The known or predetermined inter-relationship between the n(n−1)/2 time shifts ($\Delta t_{1,3} = \Delta t_{1,2} + \Delta t_{2,3}$) has been used to create an overdetermined set of equations having n(n−1)/2 equations with only (n−1) unknowns (the n−1 time shifts). It is noted that not all the n(n−1)/2 possible amplitude differences $\Delta d_{b,m}$ need be selected for use in the formulation; there is still a benefit in using the predetermined inter-relationship between the n(n−1)/2 time shifts to ensure that the second number (number of unknowns) is smaller than the first number (number of equations) so that an overdetermined set of equations is created. In the above expression $\tilde{L} \Delta \vec{t} = \Delta \vec{d}$, $\tilde{L}$ can be considered to be an operator between $\Delta \vec{d}$ and $\Delta \vec{t}$, or in other words an operator between a first number of the n(n−1)/2 possible amplitude differences $\Delta d_{b,m}(t)$ between pairs $d_b(t)$, $d_m(t)$ of the seismic data sets and a second number of the corresponding n(n−1)/2 possible time shifts $\Delta t_{b,m}(t)$.

In the above expression $L_{1,2}$ and $L_{2,3}$ contain only the derivatives, and $\Delta t_{1,2}(t)$ and $\Delta t_{2,3}(t)$ are the intrinsic, noise-free time shift functions we seek, while the $\Delta d_{1,2}(t)$, $\Delta d_{2,3}(t)$ and $\Delta d_{1,3}(t)$ are our measured differences between the three vintages of seismic data.

There are some subtle differences which arise from using multiple vintages for calculating time shifts according to the present invention. In the previous method using only the difference between two vintages, one would have to adapt the time shift estimates by allowing noise, while according to the present invention one may adapt the seismic data by allowing noise in the seismic data. We assume that it is easier to match time shifts assuming that there is noise in the seismic data than allowing systematic errors in the time shift estimates.

There are two main advantages to be obtained using the present invention:

a) An improved signal-to-noise ratio is obtained for the calculated time shifts.

b) The geophysicist needs only to deal with (n−1) calculated time shift volumes (or so-called time shift "cubes") which are consistent, i.e. the calculated time shift volumes satisfy all the seismic data optimally.

The above method of finding all the derivatives in the equations:

$$\begin{pmatrix} L_{1,2} & 0 \\ 0 & L_{2,3} \\ L_{1,3} & L_{1,3} \end{pmatrix} \begin{pmatrix} \Delta t_{1,2} \\ \Delta t_{2,3} \end{pmatrix} = \begin{pmatrix} \Delta d_{1,2} \\ \Delta d_{2,3} \\ \Delta d_{1,3} \end{pmatrix}$$

$$\left( \text{or } \tilde{L}\Delta\vec{t} = \Delta\vec{d} \right)$$

by calculating all the local time shifts would be a very laborious task requiring huge amounts of processing time. If, however, using the above-mentioned method according to a preferred embodiment of the invention, calculating coefficients of basis functions for obtaining the derivatives, the time shifts for large multi-vintage seismic data sets may calculated using far fewer processor steps.

The expressions above may express multi-vintage consecutive intrinsic time shift while keeping the above general structure:

$$\tilde{L}\Delta\vec{t}=\Delta\vec{d}$$

wherein we keep the same constraints as in the two vintage method.

We then calculate $$\tilde{A}=\tilde{L}^T\tilde{L}$$

and $$\tilde{B}=\tilde{L}^T\Delta\vec{d}.$$

We then solve:

$$\Delta\vec{t}=\tilde{A}^{-1}\tilde{B} \text{ (which is equivalent to } \Delta\vec{t}=(\tilde{L}^T\tilde{L})^{-1}\tilde{L}^T\Delta\vec{d}\text{)}.$$

This is a well-known procedure to make an overdetermined matrix become square and honouring all input data in a least squares sense.

In the above example, having three vintages of seismic data, we may use something analogous to Pascal's triangle to find the combinations:

$d_1$ $d_2$ $d_3$
$\Delta t_{1,2}$ $\Delta t_{2,3}$
$\Delta t_{1,3}$ in the given example only three time shifts arise as expected.

When we now build our big L matrix:

$$\tilde{L} = \begin{pmatrix} L_{1,2} & 0 \\ 0 & L_{2,3} \\ L_{1,3} & L_{1,3} \end{pmatrix}$$

$$\tilde{L}^T = \begin{pmatrix} L_{1,2}^T & 0 & L_{1,3}^T \\ 0 & L_{2,3}^T & L_{1,3}^T \end{pmatrix}$$

we have different sums of matrix products:

$$\tilde{A} = \tilde{L}^T\tilde{L}$$

$$= \begin{pmatrix} L_{1,2}^T & 0 & L_{1,3}^T \\ 0 & L_{2,3}^T & L_{1,3}^T \end{pmatrix} \begin{pmatrix} L_{1,2} & 0 \\ 0 & L_{2,3} \\ L_{1,3} & L_{1,3} \end{pmatrix}$$

$$= \begin{pmatrix} L_{1,2}^2 + L_{1,3}^2 & L_{1,3}^2 \\ L_{1,3}^2 & L_{2,3}^2 + L_{1,3}^2 \end{pmatrix}$$

building our new data vector is easier:

$$\tilde{B} = \tilde{L}^T\Delta\vec{d}$$

$$= \begin{pmatrix} L_{1,2}^T & 0 & L_{1,3}^T \\ 0 & L_{2,3}^T & L_{1,3}^T \end{pmatrix} \begin{pmatrix} \Delta d_{1,2} \\ \Delta d_{2,3} \\ \Delta d_{1,3} \end{pmatrix}$$

$$= \begin{pmatrix} L_{1,2}^T\Delta d_{1,2} + L_{1,3}^T\Delta d_{1,3} \\ L_{2,3}^T\Delta d_{2,3} + L_{1,3}^T\Delta d_{1,3} \end{pmatrix}.$$

From these we can calculate $\Delta\vec{t}=\tilde{A}^{-1}\tilde{B}$.

The example above used three vintages of seismic data, $\vec{d}=d_1,d_2,d_3$.

For a series of four vintages, the data set is:

$\vec{d}=d_1,d_2,d_3,d_4$, and the number of potential time shifts is $d_1$ $d_2$ $d_3$ $d_4$
$\Delta t_{1,2}$ $\Delta t_{2,3}$ $\Delta t_{3,4}$
$\Delta t_{1,3}$ $\Delta t_{2,3}$
$\Delta t_{1,4}$ In a bigger example, six consecutive vintages may be written as $\vec{d}=d_1,d_2,d_3,d_4,d_5,d_6$ and the matrix of derivatives "big L" may be written as $$\tilde{L} = \begin{pmatrix} L_{1,2} & 0 & 0 & 0 & 0 \\ 0 & L_{2,3} & 0 & 0 & 0 \\ 0 & 0 & L_{3,4} & 0 & 0 \\ 0 & 0 & 0 & L_{4,5} & 0 \\ 0 & 0 & 0 & 0 & L_{5,6} \\ L_{1,3} & L_{1,3} & 0 & 0 & 0 \\ 0 & L_{2,4} & L_{2,4} & 0 & 0 \\ 0 & 0 & L_{3,5} & L_{3,5} & 0 \\ 0 & 0 & 0 & L_{4,6} & L_{4,6} \\ L_{1,4} & L_{1,4} & L_{1,4} & 0 & 0 \\ 0 & L_{2,5} & L_{2,5} & L_{2,5} & 0 \\ 0 & 0 & L_{3,6} & L_{3,6} & L_{3,6} \\ L_{1,5} & L_{1,5} & L_{1,5} & L_{1,5} & 0 \\ 0 & L_{2,6} & L_{2,6} & L_{2,6} & L_{2,6} \\ L_{1,6} & L_{1,6} & L_{1,6} & L_{1,6} & L_{1,6} \end{pmatrix}$$

for being used in the overdetermined set of equations.

These equations needs to be solved in a sensible way for n seismic vintages. At the moment, we use a geometric scheme for building the matrix without exploiting the symmetry of the matrix, which includes some duplicate storage of data and some extra calculations. The calculation time grows quadratically with the number of vintages, and has the same order as conducting calculation of all possible combinations of time shifts.

Examples of Results of the Background Art and of the Invention

Figure 5:
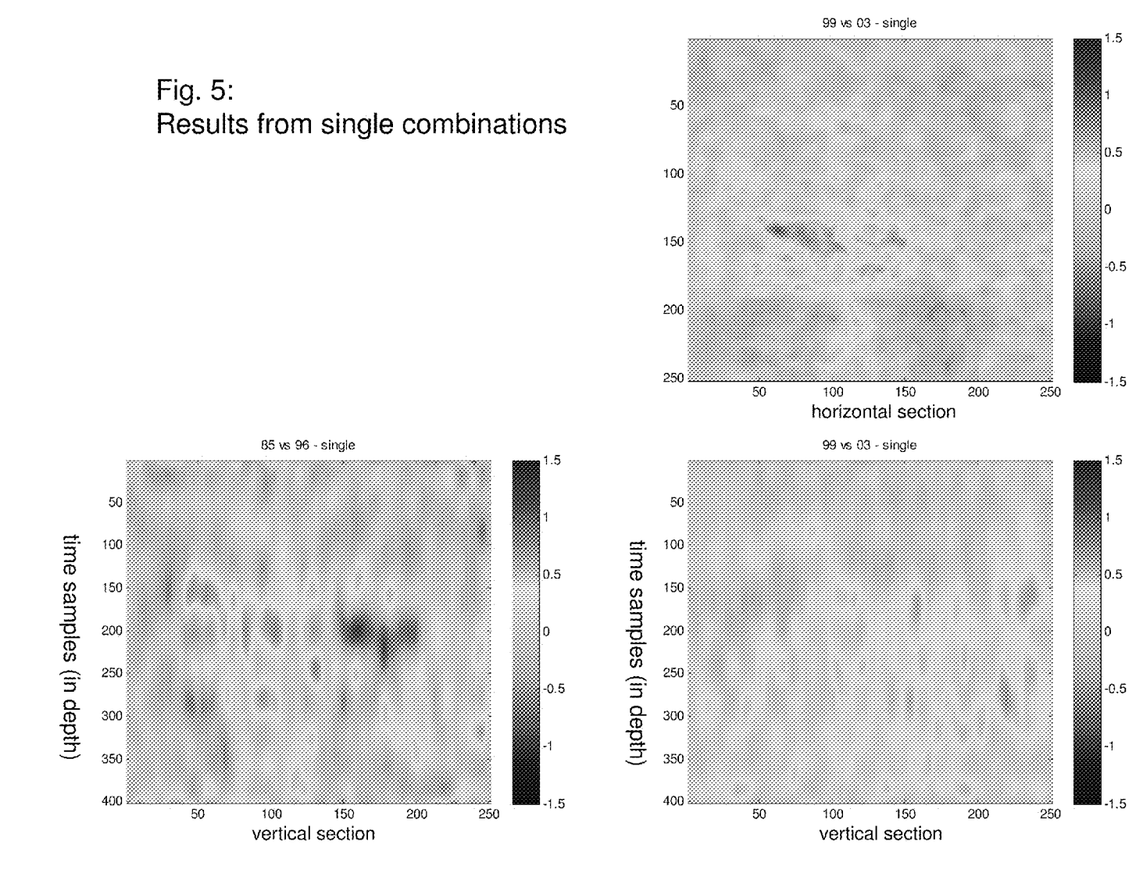
FIG. 5 illustrates results from time shifts using single combinations of vintage seismic data using the current method of estimated basis function coefficients. To the upper right, a horizontal section is shown illustrating time shifts calculated from single combinations, here between 1999 and 2003, and in the lower right, a vertical section of 400 time samples of the same. To the left is shown a vertical section is shown calculated as the difference between 1985 and 1996 seismic vintages, also using the current method of estimated basis function coefficients. The amplitude scale to the right of each section is in units of samples.

FIG. 5 illustrates results from time shifts using single combinations of vintage seismic data using the current method of estimated basis function coefficients. To the upper right, a horizontal section is shown illustrating time shifts calculated from single combinations, here between 1999 and 2003, and in the lower right, a vertical section of 400 time samples of the same. To the left is shown a vertical section is shown calculated as the difference between 1985 and 1996 seismic vintages, also using the current method of estimated basis function coefficients.

Figure 6:
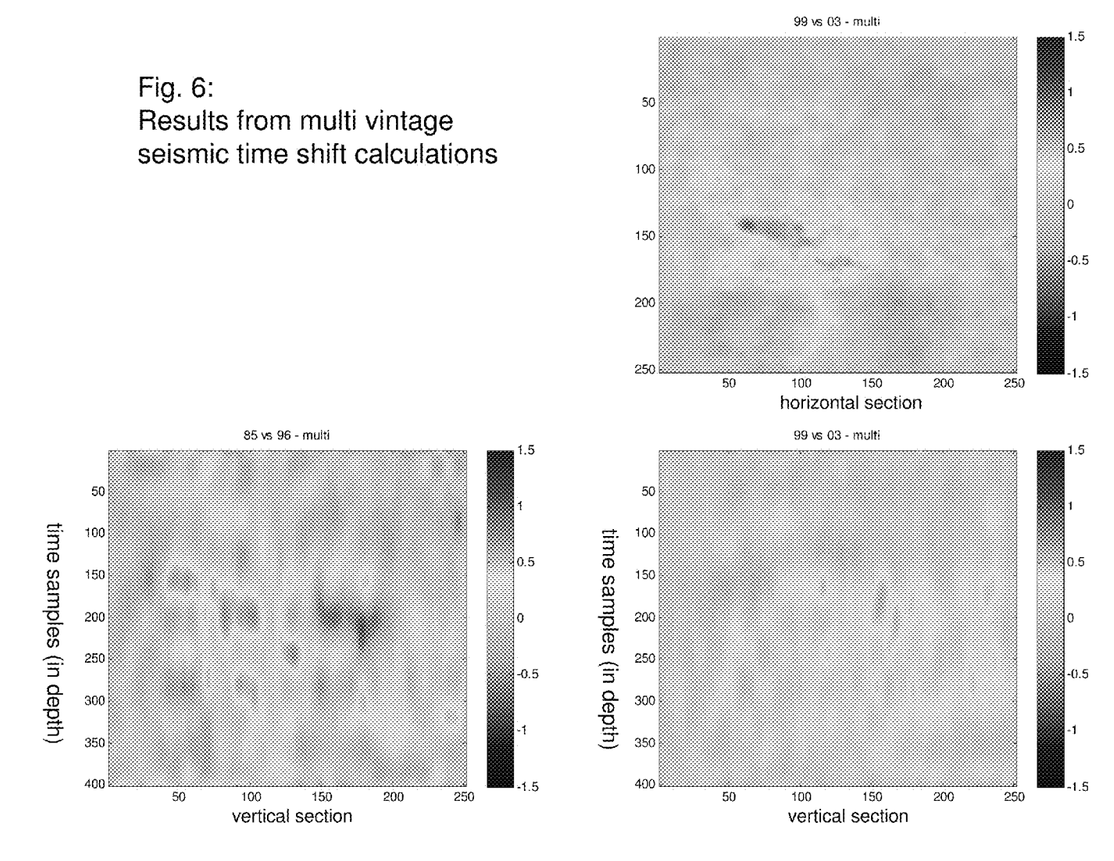
FIG. 6 illustrates corresponding results from time shifts calculated according to the present invention using multi-vintage seismic data for calculating seismic time shifts. To the upper right, a horizontal section is shown illustrating time shifts calculated according to the present invention, also here between 1999 and 2003, and in the lower right, a vertical section of 400 time samples of the same. To the left is a vertical section calculated according to the present invention as the difference between 1985 and 1996 seismic vintages.

FIG. 6 illustrates corresponding results from time shifts calculated according to the present invention using multi-vintage seismic data for calculating seismic time shifts. To the upper right, a horizontal section is shown illustrating time shifts calculated according to the present invention, also here between 1999 and 2003, and in the lower right, a vertical section of 400 time samples of the same. To the left is a vertical section calculated according to the present invention as the difference between 1985 and 1996 seismic vintages. It is clear that the horizontal section shown in FIG. 6 is smoother than the corresponding horizontal section shown in FIG. 5. But the feature in the horizontal section between 130 to 180 meters in one direction and between 50 and 150 meters in the other direction in FIG. 6 is consistent with the corresponding feature shown in FIG. 5. Further, the features shown in FIG. 6 in the vertical sections also correspond with what is shown in FIG. 5, but FIG. 6 shows generally less variation than what is shown in FIG. 5. The smoother results according to the method shown in the images of FIG. 6 is attributed to the general noise-reducing ability of the method of the invention.

Figure 7:
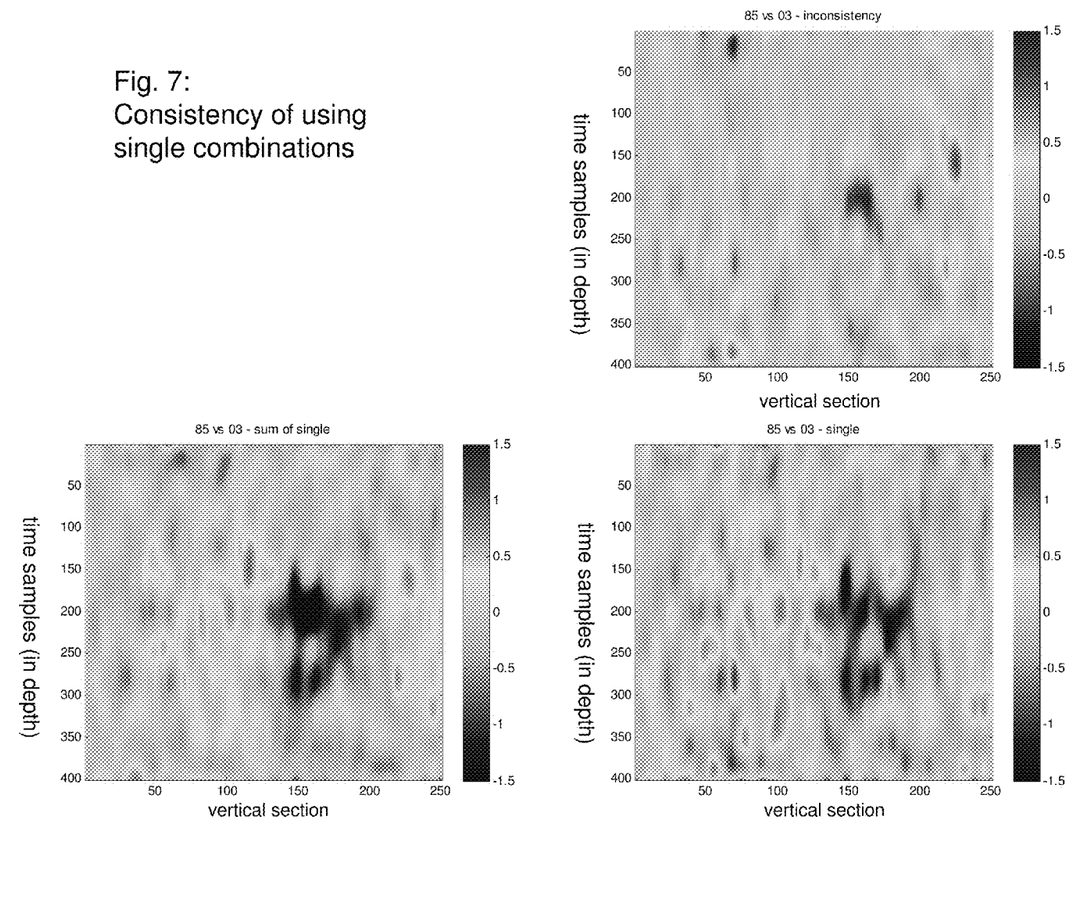
FIG. 7 shows a comparison of time shift calculations represented by summing background art time shifts as calculated for consecutive vintages of seismic data, cumulatively from 1985 to 2003 to the lower left, and in one difference calculated by the difference from 1985 to 2003 directly, to the right. In the top right diagram is shown the inconsistency between the two methods, which ideally should be zero, but which is not. This inconsistency of the background art is one of the problems sought relieved.

FIG. 7 shows a comparison of time shift calculations represented by summing background art time shifts as calculated for consecutive vintages of seismic data, cumulatively from 1985 to 2003 to the lower left, and in one difference calculated by the difference from 1985 to 2003 directly, to the right. In the top right diagram is shown the inconsistency between the two methods, which ideally should be zero, but which is not. This inconsistency of the background art is one of the problems sought relieved.

Figure 8:
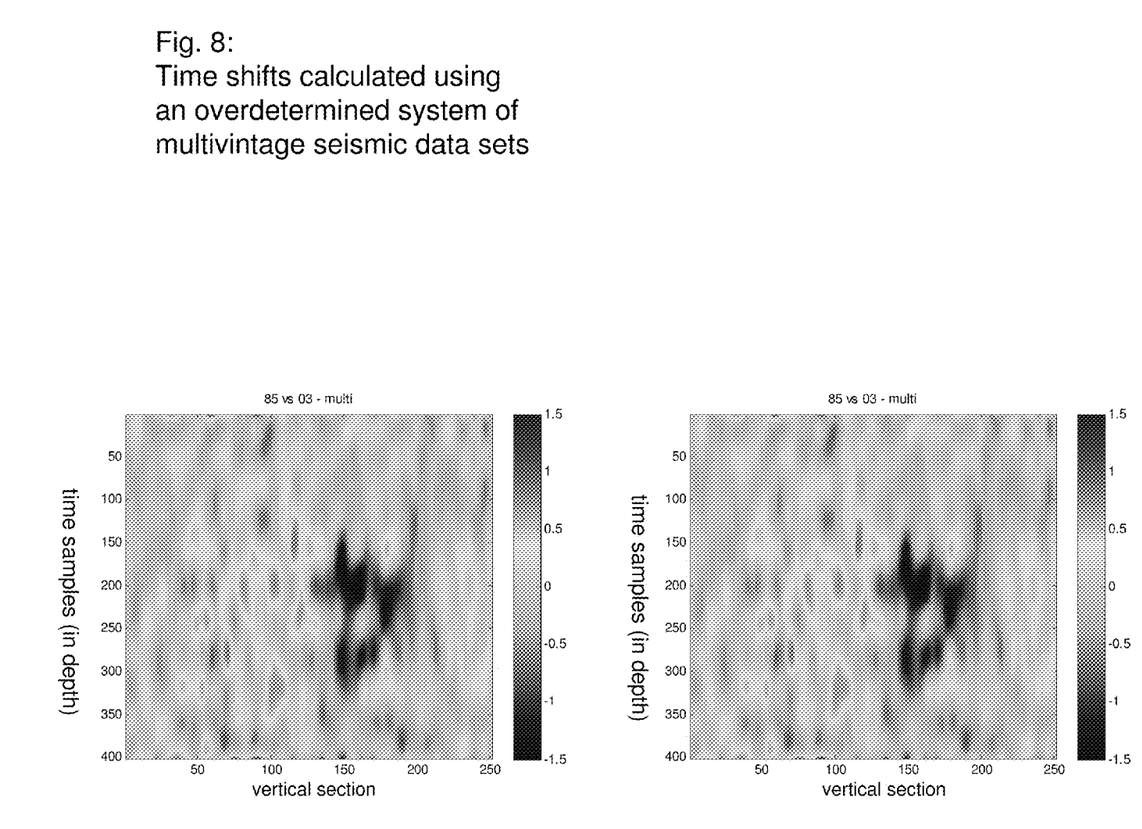
FIG. 8 shows time shift calculations over a long time span as calculated according to the present invention, in which the time shift data over a long time span from 1985 to 2003 is consistent with the accumulated consecutive time shifts from 1985 to 2003.

FIG. 8 shows time shift calculations over a long time span as calculated according to the present invention, in which the time shift data over a long time span from 1985 to 2003 is consistent with the accumulated consecutive time shifts from 1985 to 2003.

Comparing the right diagram in the lower left part of FIG. 7, which is the long term time shift from 1985 to 2003 calculated according to the background art using single combinations, with the corresponding right diagram of FIG. 8 which is the long term time shift as calculated according to the present invention, they are in good correspondence, i.e. their differences are rather small, as would be expected. The left diagram of FIG. 8 which may represent the accumulated data is of course consistent with the long term time shift shown to the right.

An advantage of the invention is that our time shift calculation method is expanded for use with multi-vintage data and is still rather fast. The method is significantly more memory demanding, but improves resolution and provides consistency to the results as shown above. The method may also improve the signal to noise ratio.

On Lateral Constraints

We may expect that in order for time shifts to be significant, they should show some lateral continuity, except for across geological faults. In an advantageous embodiment of the invention one may emphasize lateral continuity by, if considering one time trace in one geographical location, adding a weighted sum of the near neighbour traces. In a preferred embodiment, the four nearest neighbour traces would be used. The preferred embodiment works even if though faults are present, because if one of the neighbour traces is actually across a fault, the contribution may be only ¼ and it will not dominate.

On Nodes and Grids

Calculating a few coefficients of basis functions may be based on as Laplacian functions, spline functions, polynomials, etc. The spline function coefficients such as bsplines, which at the moment are preferred, requires a set of nodes to be defined. These nodes specify the points where time shifts are discontinuous in some selected derivative. We may use a regular grid for the nodes which is bound to regular sample intervals of the seismic data, but in an embodiment of the invention we may arrange some of the nodes so as for following known interfaces of the subsurface reservoir or geological interfaces, that is, interfaces of which time shift changes typically should change behaviour.

By knowing the materially caused time shifts and their depths, the change of seismic impedance may be calculated. The change in seismic impedance may be either due to a change in seismic velocity or density, or both, of the geological layers in question. Knowing such parameters about the material changes of the geological strata may provide key information input to how to control the petroleum fluid production such as adjusting the production rate of gas or petroleum, adjusting the depth of which petroleum fluids are produced, or determining injection rates of gases or fluids in order to support the petroleum fluid production.

It will be appreciated that an apparatus can provided to perform a method as described above. Such an apparatus can be controlled to perform a method as described above by way of a computer program. Such a computer program can be stored on a computer-readable medium, or could, for example, be embodied in a signal such as a downloadable data signal provided from an Internet website. The appended claims are to be interpreted as covering an operating or computer program by itself, or as a record on a carrier, or as a signal, or in any other form.

Embodiments of the present invention have been described with particular reference to the examples illustrated. However, it will be appreciated that variations and modifications may be made to the examples described within the scope of the present invention.

The invention claimed is:

1. A method of determining or detecting a change in a geophysical property of a subterranean region of the earth by determining time shifts $\Delta t(t)$ between vintages of seismic data $d(t)$ relating to a subsurface geological formation, the seismic data are acquired from the subterranean region, the method comprising:

providing a number n of three or more vintages of seismic data $d_1(t), d_2(t), \ldots, d_n(t)$ obtained from a corresponding number n of seismic surveys of the subsurface geological formation carried out at least a plurality of months or years apart, each vintage of seismic data $d_i(t)$ comprising at least one seismic trace, the seismic data being acquired using at least one seismic sensor in the seismic surveys;

formulating an operator between a first number of the $n(n-1)/2$ possible amplitude differences $\Delta d_{b,m}(t)$ between pairs $d_b(t)$, $d_m(t)$ of the seismic data sets and a second number of the corresponding $n(n-1)/2$ possible time shifts $\Delta t_{b,m}(t)$, where the second number is arranged to be less than the first number by using a predetermined inter-relationship between at least some of the $n(n-1)/2$ possible time shifts $\Delta t_{b,m}(t)$, thereby forming an overdetermined set of equations solvable for the second number of $n(n-1)/2$ possible time shifts $\Delta t_{b,m}(t)$ using the operator and the first number of the $n(n-1)/2$ possible amplitude differences $\Delta d_{b,m}(t)$; and solving the overdetermined set of equations for the second number of time shifts $\Delta t_{b,m}(t)$ to determine the time shifts $\Delta t(t)$; and determining the change in the geophysical property of the subterranean region of the earth using the determined time shifts $\Delta t(t)$.

2. The method as claimed in claim $\Delta t(t)$ as input for monitoring or controlling production or further production from a subsurface reservoir, or at least arranging for or causing such use.

3. The method as claimed in claim 1, wherein each amplitude difference $\Delta d_{b,m}(t)$ derives from a difference between a seismic trace in data set $d_m(t)$ and a seismic trace in data set $d_b(t)$.

4. The method as claimed in claim 1, wherein the first number is $n(n-1)/2$, thereby using the amplitude differences $\Delta d_{b,m}(t)$ between all $n(n-1)/2$ possible pairs $d_b(t), d_m(t)$ of the seismic data sets.

5. The method as claimed in claim 1, wherein the second number is $(n-1)$, with the $(n-1)$ time shifts $\Delta t_{b,m}(t)$ being the $(n-1)$ consecutive time shifts $\Delta t_{1,2}(t), \Delta t_{2,3}(t), \ldots, \Delta t_{n-1,n}(t)$ between consecutive vintages of said seismic data.

6. The method as claimed in claim 1, wherein the step of formulating the operator comprises calculating, for each of the first number of amplitude differences $\Delta d_{b,m}(t)$, a partial time derivative of a trace from the pair of seismic data sets $d_b(t), d_m(t)$ forming that amplitude difference $\Delta d_{b,m}(t)$, the partial time derivative being represented as $L_{b,m}$.

7. The method as claimed in claim 6, wherein the partial time derivative is calculated by estimating coefficients of basis functions.

8. The method as claimed in claim 7, wherein the basis functions comprise spline functions or Laplacian functions.

9. The method as claimed in claim 8, wherein the order of spline function coefficients is low such as one to four.

10. The method as claimed in claim 8, wherein the number of Laplacian basis function coefficients is between two and five.

11. The method as claimed in claim 6, wherein the partial time derivative for $\Delta d_{b,m}(t)$ is $$\frac{\partial}{\partial t} d_b(t),$$

where $d_b(t)$ is the earlier seismic data set of the pair of seismic data sets $d_b(t), d_m(t)$.

12. The method as claimed in claim 6, wherein the set of equations, before use of the known inter-relationship, is represented as $L_{b,m}\Delta t_{b,m} = \Delta d_{b,m}$ or in matrix form as $L\Delta \vec{t} = \Delta \vec{d}$ where L is a diagonal matrix and $\Delta t$ and $\Delta d$ are vectors, and wherein use of the known inter-relationship involves reducing a dimension of the vector $\Delta t$ and a corresponding dimension of the matrix L, and duplicating and/or rearranging at least one of the elements of the matrix L to form matrix $\tilde{L}$, thereby creating the overdetermined set of equations $\tilde{L}\Delta \vec{t} = \Delta \vec{d}$.

13. A method as claimed in claim 12, comprising first determining $\tilde{A} = \tilde{L}^T\tilde{L}$ and $\tilde{B} = \tilde{L}^T\Delta \vec{d}$ and then solving for $\Delta \vec{t}$ based on $\Delta \vec{t} = \tilde{A}^{-1}\tilde{B}$, which is equivalent to $\Delta \vec{t} = (\tilde{L}^T\tilde{L})^{-1}\tilde{L}^T\Delta \vec{d}$, or alternatively solving for $\Delta \vec{t}$ directly based on $\Delta \vec{t} = (\tilde{L}^T\tilde{L})^{-1}\tilde{L}^T\Delta \vec{d}$.

14. The method as claimed in claim 1, wherein each said vintage of seismic data $d_i(t)$ comprises a seismic trace representing a three-dimensional volume of part of the subsurface geological formation, said resulting time shifts $\Delta t(t)$ representing time shifts in said volume part of the subsurface geological formations.

15. A method as claimed in claim 1, wherein the known inter-relationship is that the sum of a plurality of individual consecutive time shifts is equal to the time span from the time span from the start of the first time shift of the plurality to the end of the final time shift of the plurality, for example $\Delta t_{1,3} = \Delta t_{1,2} + \Delta t_{2,3}$ or $\Delta t_{X,Y} = \Delta t_{X,X+1} + \Delta t_{X+1,X+2} + \ldots + \Delta t_{Y-2,Y-1} + \Delta t_{Y-1,Y}$.

16. The method as claimed in claim 1, comprising acquiring the seismic data sets.

17. The method as claimed in claim 1, comprising using the determined time shifts during petroleum production activities.

18. The method as claimed in claim 17, wherein the petroleum production activities comprise at least one of: monitoring or controlling petroleum fluid production; adjusting the production rate of gas or petroleum; adjusting the depth of which petroleum fluids are produced; and determining injection rates of gases or fluids in order to support the petroleum fluid production.

19. The method as claimed in claim 1, wherein the subsurface geological formation comprises a subsurface geological reservoir.

20. A non-transitory computer-readable medium containing a computer program product comprising computer-executable instructions for determining or detecting a change in a geophysical property of a subterranean region of the earth by determining time shifts $\Delta t(t)$ between vintages of seismic data $d(t)$ relating to a subsurface geological formation, the seismic data are acquired from the subterranean region, the computer program product comprising computer-executable instructions for:

providing a number n of three or more vintages of seismic data $d_1(t), d_2(t), \ldots, d_n(t)$ obtained from a corresponding number n of seismic surveys of the subsurface geological formation carried out at least a plurality of months or years apart, each vintage of seismic data $d_i(t)$ comprising at least one seismic trace, the seismic data being acquired using at least one seismic sensor in the seismic surveys;

formulating an operator between a first number of the $n(n-1)/2$ possible amplitude differences $\Delta d_{b,m}(t)$ between pairs $d_b(t), d_m(t)$ of the seismic data sets and a second number of the corresponding $n(n-1)/2$ possible time shifts $\Delta t_{b,m}(t)$, where the second number is arranged to be less than the first number by using a predetermined inter-relationship between at least some of the $n(n-1)/2$ possible time shifts $\Delta t_{b,m}(t)$, thereby forming an overdetermined set of equations solvable for the second number of time shifts $\Delta t_{b,m}(t)$ using the operator and the first number of possible amplitude differences $\Delta d_{b,m}(t)$; and solving the overdetermined set of equations for the second number of time shifts $\Delta t_{b,m}(t)$ to determine the time shifts $\Delta t(t)$; and determining the change in the geophysical property of the subterranean region of the earth using the determined time shifts $\Delta t(t)$.

21. A method of calculating seismic time shifts $\Delta t(t)$ between vintages of seismic data $d(t)$ for monitoring production from subsurface geological reservoirs, comprising:

conducting a number (n) of three or more seismic surveys of said subsurface geological reservoirs with large time differences such as months or years, producing a number (n) of three or more vintages of seismic data $d_1(t)$, $d_2(t), \ldots, d_n(t) = \vec{d}(t)$, each said vintage of seismic data $d_i(t)$ comprising one or more seismic trace, the seismic data being acquired using at least one seismic sensor in the seismic surveys;

formulating an operator between up to $n(n-1)/2$ possible pairs of said seismic data sets $\vec{d}(t)$ and their corresponding up to $n(n-1)/2$ time shifts $\Delta t(t)$;

solving for $(n-1)$ time shifts $\Delta t(t)$ between $(n-1)$ selected pairs of vintages of said seismic data $d_1(t), d_2(t), \ldots, d_n(t)$ as an overdetermined system of equations using the operator, applying one or more of said calculated $(n-1)$ time shifts $\Delta t(t)$ as input data for controlling further production from said subsurface reservoirs.

22. The method of claim 21, wherein while selecting the time shifts to be solved, selecting the $(n-1)$ time consecutive shifts $\Delta t_{1-2}(t), \Delta t_{2-3}(t), \ldots, \Delta t_{n-1,n}(t)$ between consecutive vintages of said seismic data $d_1(t), d_2(t), \ldots, d_n(t)$.

23. The method of claim 21, wherein in the step of formulating said operator between the $n(n-1)/2$ possible pairs of said seismic data sets $\vec{d}(t)$ by calculating partial time derivatives from at least one base trace $$\frac{\partial}{\partial t} d_b(t),$$

formulating said operator between said $n(n-1)/2$ possible pairs of seismic data sets $\vec{d}(t)$ and their corresponding $n(n-1)/2$ time shifts $\Delta t(t)$ as $$\frac{\partial}{\partial t} d_b(t) \Delta t(t) = \Delta d,$$

simplified to $L \Delta t(t) = \Delta d$ wherein $L$ comprises the partial time derivatives.

24. The method of claim 23, wherein the step of formulating said operator further comprises forming a set of $n(n-1)/2$ equations $\tilde{L}\Delta\vec{t} = \Delta\vec{d}$ which is overdetermined in said series of consecutive time shifts $\Delta t_{1-2}(t), \Delta t_{2-3}(t), \ldots, \Delta t_{n-1,n}(t)$.

25. The method of claim 21, wherein each said vintage of seismic data $d_i(t)$ comprises seismic traces representing a three-dimensional volume of part of the subsurface geological formations, said resulting series of consecutive time shifts $\Delta \vec{t}(t)$ representing time shifts in said volume part of the subsurface geological formations.

26. The method of calculating seismic time shifts of claim 21, further comprising calculating partial time derivatives $$\frac{\partial}{\partial t} d_b(t)$$

of the traces by estimating coefficients of basis functions.

27. The method of calculating seismic time shifts of claim 26, wherein said basis functions are spline functions or Laplacian functions.

28. The method of calculating seismic time shifts of claim 27, wherein the order of spline function coefficients is low such as one to four.

29. The method of calculating seismic time shifts of claim 27, wherein the number of Laplacian basis function coefficients is between two and five.

* * * * *